(12) United States Patent
Schmitz et al.

(10) Patent No.: US 7,653,584 B2
(45) Date of Patent: Jan. 26, 2010

(54) AUTOMATED EXECUTION SYSTEM HAVING PARTICIPATION

(75) Inventors: David J. Schmitz, Oswego, IL (US); Eileen Smith, Chicago, IL (US); Anthony Montesano, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 1822 days.

(21) Appl. No.: 09/896,061

(22) Filed: Jun. 29, 2001

(65) Prior Publication Data

US 2003/0004858 A1   Jan. 2, 2003

(51) Int. Cl.
*G06Q 40/00*   (2006.01)
(52) U.S. Cl. .......................................... 705/37; 705/40
(58) Field of Classification Search ............... 705/10–44
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,903,201 A | 2/1990 | Wagner | |
| 4,980,826 A | 12/1990 | Wagner | |
| 5,038,284 A | 8/1991 | Kramer | |
| 5,101,353 A | 3/1992 | Lupien et al. | |
| 5,136,501 A | 8/1992 | Silverman et al. | |
| 5,297,031 A * | 3/1994 | Gutterman et al. ............ | 705/37 |
| 5,297,032 A | 3/1994 | Trojan et al. | |
| 5,305,200 A | 4/1994 | Hartheimer et al. | |
| 5,315,634 A | 5/1994 | Tanaka et al. | |
| 5,664,115 A | 9/1997 | Fraser | |
| 5,689,652 A | 11/1997 | Lupien et al. | |
| 5,715,402 A | 2/1998 | Popolo | |
| 5,744,877 A | 4/1998 | Owens | |
| 5,774,877 A | 6/1998 | Patterson, Jr. et al. | |
| 5,787,402 A | 7/1998 | Potter et al. | |
| 5,793,301 A | 8/1998 | Patterson, Jr. et al. | |
| 5,797,002 A | 8/1998 | Patterson, Jr. et al. | |
| 5,809,483 A | 9/1998 | Broka et al. | |
| 5,813,009 A | 9/1998 | Johnson et al. | |

(Continued)

FOREIGN PATENT DOCUMENTS

EP      0 952 536 A1   10/1999

(Continued)

OTHER PUBLICATIONS

The National Association of Securities Dealers, Inc., "NASD Notice to Members 00-65," Sep. 2000, (5 pages).

(Continued)

*Primary Examiner*—Frantzy Poinvil
(74) *Attorney, Agent, or Firm*—Brinks Hofer Gilson & Lione (57) ABSTRACT

A method and system is provided for allowing a participant that generates order flow to participate in automated execution trades that are generated by the participant's order flow, without affecting the price of execution to the retail customer. The method and system automatically assigns a stated percentage of the contra-side of each customer trade to the participant that sent in the order flow.

20 Claims, 7 Drawing Sheets

U.S. PATENT DOCUMENTS

| | | | |
|---|---|---|---|
| 5,819,237 A | 10/1998 | Garman | |
| 5,845,266 A | 12/1998 | Lupien et al. | |
| 5,873,071 A | 2/1999 | Ferstenberg et al. | |
| 5,905,974 A | 5/1999 | Fraser et al. | |
| 5,913,202 A | 6/1999 | Motoyama | |
| 5,915,209 A | 6/1999 | Lawrence | |
| 5,915,245 A | 6/1999 | Patterson, Jr. et al. | |
| 5,924,082 A | 7/1999 | Silverman et al. | |
| 5,950,176 A | 9/1999 | Keiser et al. | |
| 5,950,177 A | 9/1999 | Lupien et al. | |
| 5,963,923 A | 10/1999 | Garber | |
| 5,970,479 A | 10/1999 | Shepherd | |
| 5,978,779 A | 11/1999 | Stein et al. | |
| 6,012,046 A | 1/2000 | Lupien et al. | |
| 6,014,627 A | 1/2000 | Togher et al. | |
| 6,014,643 A * | 1/2000 | Minton | 705/36 R |
| 6,016,483 A | 1/2000 | Rickard et al. | |
| 6,018,722 A * | 1/2000 | Ray et al. | 705/36 R |
| 6,021,397 A | 2/2000 | Jones et al. | |
| 6,035,288 A | 3/2000 | Solomon | |
| 6,076,068 A | 6/2000 | DeLapa et al. | |
| 6,119,103 A | 9/2000 | Basch et al. | |
| 6,195,647 B1 | 2/2001 | Martyn et al. | |
| 6,199,050 B1 | 3/2001 | Alaia et al. | |
| 6,230,146 B1 | 5/2001 | Alaia et al. | |
| 6,247,000 B1 | 6/2001 | Hawkins et al. | |
| 6,263,321 B1 | 7/2001 | Daughtery, III | |
| 6,266,651 B1 | 7/2001 | Woolston | |
| 6,269,346 B1 | 7/2001 | Cristofich et al. | |
| 6,278,982 B1 | 8/2001 | Korhammer et al. | |
| 6,282,521 B1 | 8/2001 | Howorka | |
| 6,285,989 B1 | 9/2001 | Shoham | |
| 6,317,727 B1 | 11/2001 | May | |
| 6,317,728 B1 | 11/2001 | Kane | |
| 6,321,212 B1 | 11/2001 | Lange | |
| 6,377,940 B2 | 4/2002 | Tilfors et al. | |
| 6,405,180 B2 | 6/2002 | Tilfors et al. | |
| 6,421,653 B1 | 7/2002 | May | |
| 6,505,175 B1 * | 1/2003 | Silverman et al. | 705/36 R |
| 6,539,362 B1 | 3/2003 | Patterson, Jr. et al. | |
| 6,560,580 B1 | 5/2003 | Fraser et al. | |
| 6,564,192 B1 | 5/2003 | Kinney, Jr. et al. | |
| 6,601,627 B2 | 8/2003 | Kasai et al. | |
| 6,618,707 B1 | 9/2003 | Gary | |
| 6,647,374 B2 | 11/2003 | Kansal | |
| 2002/0002530 A1 | 1/2002 | May | |
| 2002/0013760 A1 | 1/2002 | Arora et al. | |
| 2002/0019799 A1 | 2/2002 | Ginsberg et al. | |
| 2002/0082967 A1 | 6/2002 | Kaminsky et al. | |
| 2002/0138401 A1 | 9/2002 | Allen et al. | |
| 2002/0152152 A1 | 10/2002 | Abdelnur et al. | |
| 2002/0156716 A1 | 10/2002 | Adatia | |
| 2002/0198813 A1 | 12/2002 | Patterson, Jr. et al. | |
| 2003/0018569 A1 | 1/2003 | Eisenthal et al. | |
| 2003/0208430 A1 | 11/2003 | Gershon | |

FOREIGN PATENT DOCUMENTS

| | | |
|---|---|---|
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |

OTHER PUBLICATIONS

Special Study: Payment for Order Flow and Internalization in the Options Markets, www.sec.gov/news/studies/ordpay.htm, printed on Oct. 19, 2001, (40 pages).

E. Clemons et al., "Information Technology and Screen-Based Securities Trading: Pricing the Stock and Pricing the Trade", *Management Science*, vol. 43, No. 12, Dec. 1997.

"The Pandora's Box over autoquotes; Industry Trend or Event", *Wall Street & Technology*, Section No. 3, vol. 13, p. 38; ISSN: 1060-989X, Mar. 1997.

"How is a Trade Executed—Limit Order", *Nasdaq*, dated Mar. 7, 2000, One Page.

S. Cosgrove, "Courting Retail, Institutional Customers, CBOE, AMEX Get Creative", *Knight-Ridder Financial News*, Jan. 29, 1993.

Self-Regulatory Organizations: Proposed Rule Change by the Cincinnati Stock Exchange Relating to Small Order Execution Guaranty, 1985 WL 547562; SEC Release No. 22330, Aug. 15, 1985.

A Monitoring Report On The Operation Of The Cincinnati Stock Exchange National Securities Trading System, U.S. Securities And Exchanges Commission, May 1981.

A Report On The Operation Of The Cincinnati Stock Exchange National Securities Trading System 1978-1981, U.S. Securities And Exchange Commission, Sep. 1982.

CBOT Press Release Entitled "Impressive Project A® Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.

A. Frino et al., Price And Time-Priority Versus Pro-Rata Algorithms In Electronically Traded Futures Markets: Simulation Based Performance Characteristics, Oct. 3, 1998, http://www.sirca.org.au/research/database.html (Document 1998009.pdf).

A. Frino et al., The Liquidity Of Automated Exchanges: New Evidence From Germany Bund Futures, vol. 8, Journal Of International Financial Markets, Institutions And Money, pp. 225-241 (1998).

Self-Regulatory Organization; Chicago Stock Exchange, Inc.; Order Approving Proposed Rule Change Creating The Chicago Match System (59 F.R. 63141) SEC Release No, 34-35030, 1994 SEC LEXIS 3863, Nov. 30, 1994.

A. Sarker et al., "Electronic Trading On Futures Exchanges," Current Issues In Economics And Finance, Federal Reserve Bank Of New York, vol. 4, No. 1, Jan. 1998.

Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.

CBOE Rules, CCH (1989) (Rules 6.45-8.80).

CBOE Information Circular IC 93-88 (Nov. 18, 1993).

U.S. Congress, Office Of Technology Assessment, "Electronic Bulls And Bears: U.S. Securities Markets And Information Technology", OTA-CIT-469 (Washington, DC: U.S. Government Printing Office, Sep. 1990). (selected excerpts).

Self-Regulatory Organizations; Filing and Order Gracting Accelerated Approval of Proposed Rule Change by the Chicago Board Options Exchange, Inc., Relating to System Modifications to the Retail Automated Execution System, SEC Release No. 34-32879, 58 F.R. 49342, Sep. 22, 1993.

CBOE Regulatory Circular RG 91-71, Dec. 25, 1991.

Notice Of Receipt Of Plan Filed Pursuant To Section 11A(a)(3)(B) Of The Securities Exchange Act Of 1934, 1980 WL 29398, SEC Release No. 16519, Jan. 22, 1980.

New York Stock Exchange Constitution And Rules (Commerce Clearing House, Inc. New York Stock Exchange Guide) Jul. 15, 1965, pp. 2644-2645; 2682-2683.

R. Teweles et al., The Stock Market, Fifth Edition, John Wiley & Sons, 1987, pp. 176-181.

J. Meeker, The Work Of The Stock Exchange, The Ronald Press Company 1923, pp. 108-109.

CBOE Information Circular IC91-15, Feb. 25, 1991.

Domowitz, Ian, "A taxonomy of automated trade execution systems", 12 Journal of Int'l Money and Finance, pp. 607-631, dated 1993.

SEC Notice, Release No. 34-51107, SR-CBOE-2004-75, Federal Register vol. 70, No. 23, dated Friday, Feb. 4, 2005, pp. 6051-6057.

PCS Plus The Pacific Exchange, PCX Plus Overview, Oct. 9, 2003, six pages.

Evans et al. "The Effects of Electronic Trading System On Open-outcry Commodity Exchange", Social Science 410, Nov. 1998.

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.

Tsang, R. "Open outcry and electronic trading in futures exchanges", Bank of Canada Review, Spring 1999, pp. 21-39.

Elind Computers Private LMTD, "Online Global Trading System for Marketplaces", brochure, dated 2002.

C. Danis, et al. "Alternatives to an Open Outcry Market: An Issue of Supporting Cooperation in a Competitive Situation", IBM TJ Watson Research Center, USA, believed to have been published prior to Apr. 24, 2003.

Clemens et al., "Segmentation, differentiation, and flexible pricing: Experiences with information technology and segment-tailored strategies", Journal of Management Information Systems: JMIS, vol. 11, No. 2, pp. 9-36, Fall 1994.

"Squeezing the poor", Guardian, p. 8, Feb. 11, 1997.

"La libre competencia sacude a las electricas", Actualidad Economica, p. 18, Sep. 30, 1996.

Souter, Gavin, "Bermuda's reinsurers eager to please", Business Insurance, vol. 28, No. 44, p. 77, Oct. 31, 1994.

"The Electronic Component", The Options Institute Online Learning Center, obtained at the internet address: http://www.cboe.com/LearnCenter/cboeeducation/Course_02_02/mod_02_03.html dated 2003.

"Self-Regulatory Organizations; Notice of Filing of Proposed Rule Change and Amendment No. 1 Thereto by the Pacific Exchange, Inc. Relating to the Exchange's New Trading Platform for Options, PCX Plus", 67 Fed. Reg. 69,580-69, 592 (Nov. 18, 2002).

\* cited by examiner

```
PME                              PARAMETERS
  FIRM   z                                    BART ID  B008 ;  ELIG Y
  CLASS ABC       POST 06   STATION 05        BOOTH ROUTE ALL       N
  GLOBAL UPDATES       Y                      BOOK MKT VOL          00500
                                              BOOK PRE-OPEN LMT VOL 00500
  FBR:   PRINTER  P099    PARM   C (C,D,N)    PRE-OPEN TIME         23 : 59
         PAR ID   W047    MKT VOL    00099    ETH VOLUME            00000
         BTM TO FBR   Y                       BOOK PRICE COMMITMENT 00000
  RAES:  V1 00020 S +1    REJ DEST C (C,B,P)  SPRD PRINTER          P04E
         V2 00050 S *                         PRINTERS:     WIRE       BOOTH
  TTT:   EBOOK    N (A,E,L,N) PRINTER         ORDER    C P06E P P06E  P06E
         PAR    Y            PRINTER P079     REPORT     P06E          *
  AFP:   PCT 000%
  RANGE    DEV 1    VOL 1    DEV 2    VOL 2   FBR DEV   FBR VOL    SPRD VOL
    1      B        00099    B        00099   A         00099      00010
    2      B        00099    B        00099   A         00099      00010
    3      B        00099    B        00099   A         00099      C0010
    4      B        00099    B        00099   A         00099      C0010

PF12/24 - NEW SCREEN =>     PF4/16 - MODIFY      ENTER KEY - DISPLAY
  PF2/14 - CONTINGENCY ROUTING  PF10/22 - GLOBAL   PF5/17 - ORIGIN ROUTING
```

FIG. 6

```
MAPRMZ     RAES AFP FIRM LOGIN     PLEASE ENTER ACR:                    10:55:05
                                   CLASS  SELECTION                     02/13/01

CLASS ALLOC      CLASS ALLOC      CLASS ALLOC     CLASS ALLOC     CLASS ALLOC

Z AIY   20 *    Z APA   20 *    Z AXA   20 *    Z BCU   20 *    Z CKV   20 *
      Z CWA   20 *    N DNA   20      N DWN   20      Z ESV   20 *    Z FBB   20 *
      Z HRC   20 *    N JPB   20      Z JSA  002 *    Z KCQ   20 *    Z KEI   20 *
      Z LYO   20 *    Z NBU   20 *    Z NI    20 *    Z OMC   20 *    Z OYJ  002 *
      Z PPP   20 *    Z PQP   20 *    Z RDC   50 *    Z REI   20 *    Z SAQ   20 *
      Z SJU   20 *    Z TUD   20 *    Z WCM   20 *    Z WGO   20 *    Z YAG   10 *
      Z YBG  002 *    Z YMB  002 *    _ ___   ___    _ ___   ___    _ ___   ___

_ ___   ___    _ ___   ___    _ ___   ___    _ ___   ___

"Z" LOGIN RAES            "N" EXCLUDE CLASS FROM LOGIN
        JUST PRESS PF3/15 (NO SELECTIONS) TO LOGIN ALL CLASSES INTO AFP/RAES

PF3/15 - LOGIN         PF8/20 - FORWARD       PF12/24 - MAIN MENU
                                 PF7/19 - BACKWARD              (NO UPDATE)
END OF LIST
```

FIG. 7

```
MAPRMZ         RAES AFP FIRM/BROKER LOGOUT     BROKER: ABC           13:30:09
                         CLASS SELECTION                             02/13/01

CLASS            CLASS           CLASS           CLASS          CLASS

N AIY            Z APA   *       Z AXA   *       Z BCU   *      Z CKV   *
          N CWA            B DNA   *       B DWN   *       Z ESV   *      Z FBB   *
          N HRC            B JPB   *       Z JSA   *       Z KCQ   *      Z KEI   *
          Z LYO   *        Z NBU   *       Z NI    *       Z OMC   *      Z OYJ   *
          Z PPP   *        Z PQP   *       Z RDC   *       Z REI   *      Z SAQ   *
          Z SJU   *        Z TUD   *       Z WCM   *       Z WGO   *      Z YAG   *
          Z YBG   *        Z YMB   *       _____           _____          _____

_____            _____           _____           _____

ENTER AN "X" NEXT TO THE CLASS(ES) YOU WISH TO LOGOUT OF AND PRESS PF6/18.
         JUST PRESS PF6/18 (NO SELECTIONS) TO LOGOUT ALL CLASSES.

PF6/18 - LOGOUT     PF8/20 - FORWARD       PF12/24 - MAIN MENU
                              PF7/19 - BACKWARD              (NO UPDATE)
END OF LIST
```

FIG. 8

AUTOMATED EXECUTION SYSTEM HAVING PARTICIPATION

FIELD OF THE INVENTION

The present invention relates in general to an automated execution system for trading products such as securities, commodities, or derivatives.

BACKGROUND OF THE INVENTION

Participants typically use markets to facilitate the exchange of products and services. Exchanges or trading facilities assist in developing the organizational structure of the markets to meet the needs of participants, other traders, and the economic society as a whole. For instance, securities or derivatives are exemplary types of products that are traded publicly at many of the trading facilities throughout the world. A type of security or derivative, referred to generally as "options," convey certain rights to buy or sell an underlying asset, stock, commodity, or other security at a fixed price for a specific period of time, until expiration for an American-style option or at expiration for a European-style option. Currently, all options that trade on U.S. securities exchanges are issued, guaranteed, and cleared by the Options Clearing Corporation (OCC). OCC is a registered clearing corporation with the Securities and Exchange Commission (SEC). SEC is a government commission created by Congress to regulate the U.S. securities exchanges and protect investors.

According to the above example, participants such as members of the trading facilities can trade options by submitting agency buy and sell orders to a trading facility, referred to as "order flow." Opposite to the buy and sell orders are typically market makers, specialists, or designated primary market makers (DPMs). Market makers provide liquidity in securities trading by risking their own capital for proprietary trading. Specialists and DPMs are similar to market makers except that they are allowed to represent orders from the public or participants, and may have other additional obligations and participation rights. Although market makers, specialists, or designated primary market makers (DPMs) can play different roles in the trading process they will be collectively referred to hereinafter as "market makers."

Typically, participants and market makers can trade their products at a trading facility by open outcry. However, trading facilities are also utilizing current technology to develop electronic trading systems. In an exemplary electronic trading system a participant submits buy and sell orders for automatic execution at an exchange or trading facility. For example, logged-on market makers can be made eligible to trade the incoming orders. In this example, once the electronic trading begins the market maker quotes are typically recorded in the automated and computer-based trading system, and matched up automatically with orders that enter the execution system electronically. However, unlike manual-style trading, this exemplary trading system and other electronic or automatic trading systems do not allow a participant to participate in trades resulting from their own generated order flow.

Thus, there is a need for an electronic or automatic execution system that enables participants who submit buy orders or sell orders or both to participate in trades resulting from that order flow.

SUMMARY OF THE INVENTION

A method and system for allowing a participant to participate in their generated order flow is provided. The method and system can automatically assign a stated percentage of the contra-side of each customer order to the participant that submitted the order flow without affecting the price of execution to the customer.

In an aspect of the present embodiment, a method of trading securities or derivatives over an automated execution system is provided. A participant submits an electronic order on behalf of a customer into the automated execution system. A portion of the electronic order volume is executed against the participant, and the remaining portion of the electronic order volume is executed against participating market makers by the automated execution system. In an exemplary embodiment, the customer preferably receives each execution at the National Best Bid or Offer thereby allowing the customer to receive the best available price at the time of execution.

In another aspect of the present embodiment, an order routing system forwards a participant's electronic order to an automated execution system that includes a firm participation subsystem. The firm participation subsystem automatically executes a portion of the electronic order volume against the participant. The remaining portion of the electronic order volume is sent to the market maker subsystem for execution. In the exemplary embodiment, a book process system is utilized to determine if the incoming electronic order can be executed against an order resting in the book at the prevailing market price, and if so, the order is executed against the resting order.

The present embodiments provide a participant with the ability to participate in their own generated order flow while preferably assuring customer executions at the National Best Bid or Offer. A participant such as a broker or firm may submit buy and sell orders for their customer to an automated execution system. The automated execution system then enables the participant to desirably participate on the contra-side of the trades resulting from that order flow. Therefore, by allowing a participant that generates order flow to participate in their generated order flow, exchanges or trading facilities may meet the needs of the participants, market makers, and other others impacted by the markets. Moreover, exchanges or trading facilities can desirably attract participants to their respective automated execution system. Additionally, the present embodiments would preferably not alter or affect the price at which the customers' orders receives an execution.

The foregoing and other objects, features and advantages of the automated execution system having firm participation will be apparent from the following more particular description of preferred embodiments as illustrated in the accompanying drawings.

DETAILED DESCRIPTION OF PREFERRED EMBODIMENTS

The exemplary embodiments disclose a system and method for allowing a participant that submits customer order flow to participate in a stated percentage of the generated order flow, preferably without affecting the price of execution to the customer. The exemplary embodiments have been implemented in an electronic trading system that includes an automatic execution system. More specifically, the exemplary embodiments have been implemented on an automatic execution system that facilitates trading of option contracts. It should be understood, however, that the present embodiments may be utilized in other electronic execution or trading systems that trade commodities, derivatives or securities of any type including, without limitation, any note, equity or index option, exchange traded fund, warrant, stock, treasury stock, bond, future, debenture, certificate of interest or participation in any profit-sharing agreement or in a firm. Therefore, details regarding the electronic trading system, the automatic execution system, and the types of products traded are provided as an example, and are not necessary to the invention unless otherwise specified.

Figure 1:
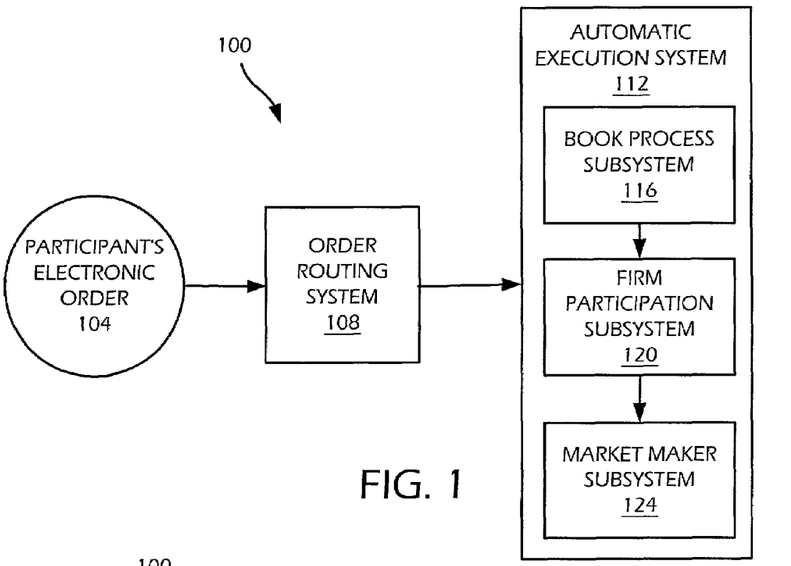
FIG. 1 is a block diagram of a electronic trading system that utilizes the automatic execution system of the present embodiment.

FIG. 1 is a block diagram of an electronic trading system 100 that utilizes the automatic execution system 112 of the exemplary embodiment. The electronic trading system 100 generally includes at least one participant's electronic order 104, order routing system 108, and automatic execution system 112. The automatic execution system 112 facilitates the trading of option contracts and preferably allows a participant that submits an electronic order 104 to participate in a stated percentage of the electronic order, described more below.

Participants include any person or entity who has access to the electronic trading system 100, such as a registered member and their corresponding firm, broker/dealer, etc. Preferably, the participant submits their customers' electronic order 104, in the form of a buy or sell order, electronically to the order routing system 108 via a wired or wireless network (not shown). The customer includes the client of the participant such as, for example, an international bank, farmer, business person, homemaker, and so on.

The electronic order 104 is preferably submitted through a user device such as a personal computer, laptop, telephone, hand-held terminal, personal digital assistant, and so forth. For example, a participant in communication with the order routing system 108 might submit orders electronically from their branch or office, or order desk to the order routing system 108. Moreover, orders phoned to the securities exchange's floor, or wired to a participant's own house printer can be re-entered into the order routing system 108 by the participant's booth staff. In any event, the electronic order 104 is submitted and transmitted over a wired or wireless network to the order routing system 108.

Preferably, the order routing system 108 provides the participant a method of efficiently delivering the electronic order 104 to a securities exchange, such as at the Chicago Board Options Exchange located in Chicago, Ill. Upon receipt of the electronic order 104 at the order routing system 108, the order 104 is preferably logged to a database and evaluated, based on order volume (i.e., the number of option contracts in the electronic order 104) and price, to determine its appropriate routing destination such as the automated execution system 112. However, before the order routing system 108 routes the electronic order 104, it preferably uses pre-defined guidelines to determine if the electronic order 104 is eligible for execution at the automated execution system 112.

Exemplary guidelines used to determine the eligibility of the electronic order 104 can include price, volume, and series guidelines. According to the price guideline, the electronic order 104 is eligible when the order is either a simple market order, an order that can be executed at the prevailing market price, or a marketable limit order, referred to as an order to buy or sell option contracts at a specified price or better. According to the volume guideline, the electronic order 104 is eligible if the contract size of the order is within the limits set for the class and series (e.g., 10 contracts or fewer). Of course, the order routing system 108 can utilize more or fewer guidelines. Also, the guidelines utilized by the order routing system 108 can change from those exemplary guidelines described above depending on the desired eligibility requirements.

An eligible electronic order 104 is then forwarded to the automated execution system 112 for execution. In the exemplary embodiment, the automated execution system 112 generally includes a book process subsystem 116, firm participation subsystem 120, and market maker subsystem 124. Although the automated execution system 112 can include more or fewer subsystems, the firm participation subsystem 120 is preferably utilized to enable a participant to participate in a stated percentage of each electronic order 104 they submit for execution through the automated execution system 112.

Therefore, each participant that submits order flow 104 to the automated execution system 112 might be entitled to participate in a stated percentage (e.g., between 0 and 100%) for that electronic order 104, without affecting the price of execution to the customer. If there is a remaining portion of the electronic order 104, then the balance of the order 104 would be allocated pursuant to another subsystem such as the market maker subsystem 124, if so desired, to execute or fill the remaining portion of the electronic order 104.

Thus, according to the exemplary embodiment, assume a stated percentage or firm participation percentage of 20%. Then, if a participant directs a 50 option contract order to the automated execution system 112, the participant would receive an allocation of 10 option contracts (i.e., 20% of 50 option contracts=10 option contracts) while the remaining portion of 40 option contracts would preferably be allocated to the market maker subsystem 124.

In addition to the firm participation and market maker subsystems 120 and 124 respectively, a book process subsystem 116 is preferably utilized to determine if the participant's electronic order 104 can be executed against the book at the prevailing market price. The book process subsystem 116 preferably aids in protecting the priority of electronic orders in the book. Therefore, the electronic order 104 is subject to resting orders in the book before it becomes subject to the firm participation and market maker subsystems 120 and 124, respectively.

According to an exemplary embodiment, orders received at the book process subsystem 116 preferably trade before any other subsystems 120 and 124 can trade at that price. Thus, to maintain book priority, the automated execution system 112 executes an electronic order in the book process subsystem 116 when the book contains a resting order which matches the market quote. For example, if the book has a SELL order matching the market OFFER, a BUY order would be executed at the book process subsystem 116 up to the quantity available in the book. Furthermore, if the book contains a BUY order which matches the market BID, a SELL order would execute at the book process subsystem 116 up to the quantity available in the book. These orders (i.e., BUY or SELL) route to the book process subsystem 116 for automatic execution.

To provide an exemplary illustration, assume that a customer limit order in the book represents the best bid (OFFER) at which a book process subsystem 116 order would be filled. Consequently, any incoming order would be filled up to the quantity available in the book pursuant to book procedures. The remaining order, if any, would then be forwarded to the firm participation subsystem 120. Therefore, to provide a numerical example, assume that a customer order to sell 40 contracts is represented in the book and a participant submits a market order to buy 50 contracts, the customer order in the book would receive full execution of the order for 40 contracts. Then 10 option contracts (50 buy option contracts−40 executed option contracts =10 buy option contracts) would remain and are forwarded to the firm participation subsystem 120.

The firm participation subsystem 120 receives the electronic order 104 and determines if the participant is participating in the order. If not, the order is transferred to the market maker subsystem 124 for further execution. If so, a stated percentage of the remaining order volume is executed against the participant. Therefore, the firm participation subsystem 120 can automatically assign a stated percentage of the contra-side of each order to the participant that sent the order in. If any portion of the order is filled at the firm participation subsystem 120 a filled report is generated. If there is remaining order volume, it is sent to the market maker subsystem 124.

According to the earlier numerical example, 10 option contracts (e.g., 50 buy option contracts−40 executed option contracts=10 buy option contracts) are forwarded from the book process subsystem 116 to the firm participation subsystem 120. With an exemplary firm participation percentage of 20%, the participant would then be entitled to participate in 20% of the remaining order, or 2 option contracts (e.g., 20% of 10 option contracts=2 option contracts). The remaining 8 option contracts would then be forwarded to market maker subsystem 124 for execution.

The market maker subsystem 124 receives the remaining order volume, if any, and attempts to execute the trades until the electronic order is filled. The market maker subsystem 124 preferably executes an electronic order against the next available market maker on an automated execution "wheel". The wheel is a rotating list of eligible market makers including DPMs that are providing liquidity for marketable orders. If any portion of the order is filled, then a fill report is generated. If there is remaining order volume, it is sent back through the market maker subsystem 124 for further execution.

With reference to FIG. 1, the diagram illustrates in general the overall system and method of the electronic trading system 100, however, it should be understood that more or fewer systems or subsystems may be used while remaining within the scope of the present invention. For example, the electronic order 104 could be transmitted directly to the automated execution system 112 and therefore bypass the order routing system 108, if so desired. Moreover, the book process subsystem 116 and market maker subsystem 124, although desirable, are not essential to the automatic execution system 112. Furthermore, it would be appreciated by those skilled in the art that other known subsystems, if desirable, may be substituted in place of these described subsystems 116 and 124.

Figure 2:
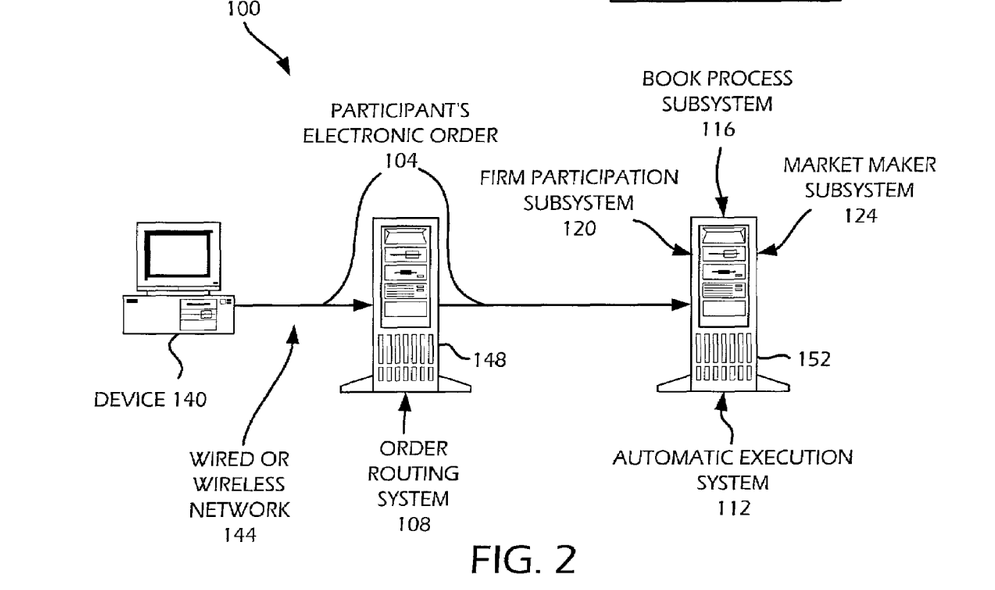
FIG. 2 is a diagram that illustrates an exemplary implementation of the electronic trading system of FIG. 1.

FIG. 2 is a diagram that illustrates an exemplary implementation of the electronic trading system 100 of FIG. 1. The server 148 running the order routing system 108 communicates with a plurality of remote terminals such as device 140, or for example, a personal computer. Other devices can be utilized to submit the electronic order 104 such as a laptop, telephone, hand-held terminal, personal digital assistant, and so forth. The electronic order 104 is preferably submitted by a participant through the device 140 over a wired or wireless network 144 to the server 148. The server 148 is preferably located at the securities exchange and is in communication with a server 152 that runs the automatic execution subsystem 112. The order routing system 108 preferably routes the electronic order 104 to server 152 to execute the electronic order 104 at automatic execution system 112.

The server 152 that runs the automatic execution system 112 preferably runs the application software for the firm participation subsystem 120, book process subsystem 116, and market maker subsystem 124. However, if so desired, the application for each subsystem can be operated on separate servers. Also, the order routing system 108 and automatic execution system 112 may be hosted on the same server, if so desired.

Figure 3A:
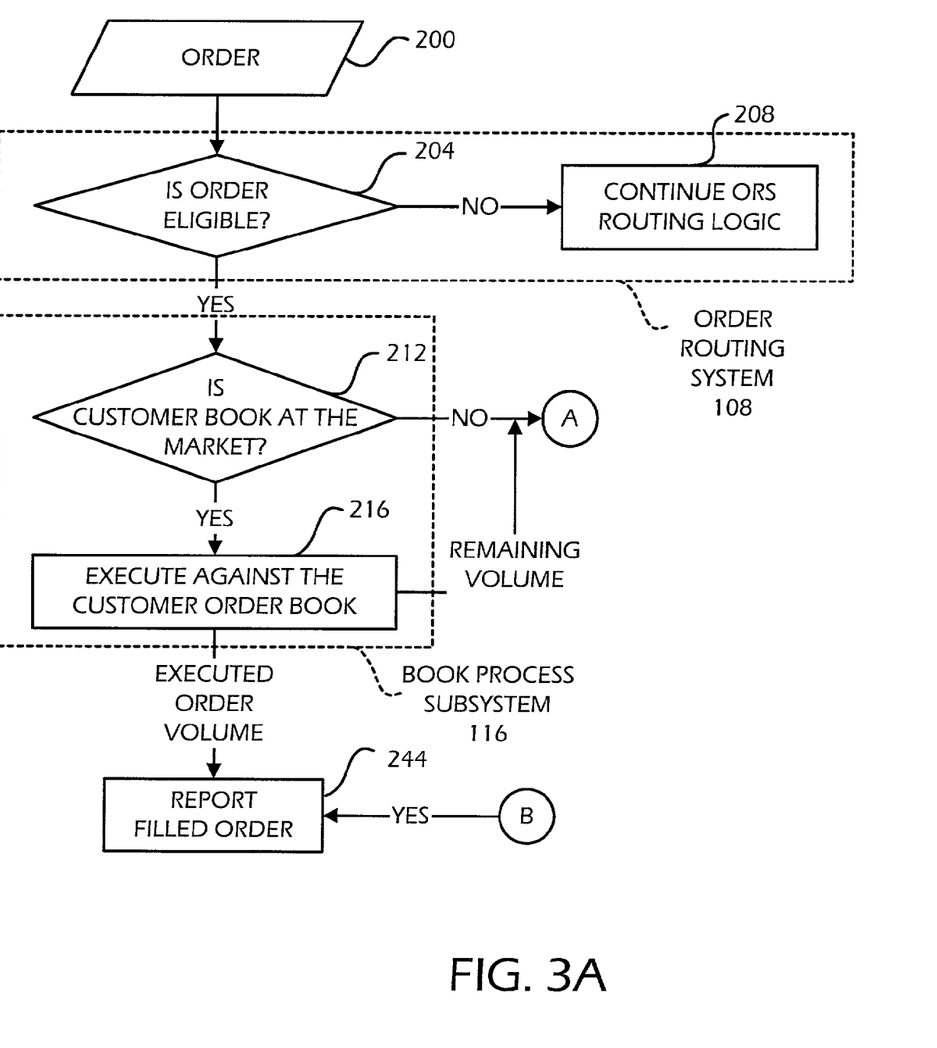
FIGS. 3A and 3B are flowcharts showing an exemplary automatic execution process used in the system of FIG. 1.
Figure 3B:
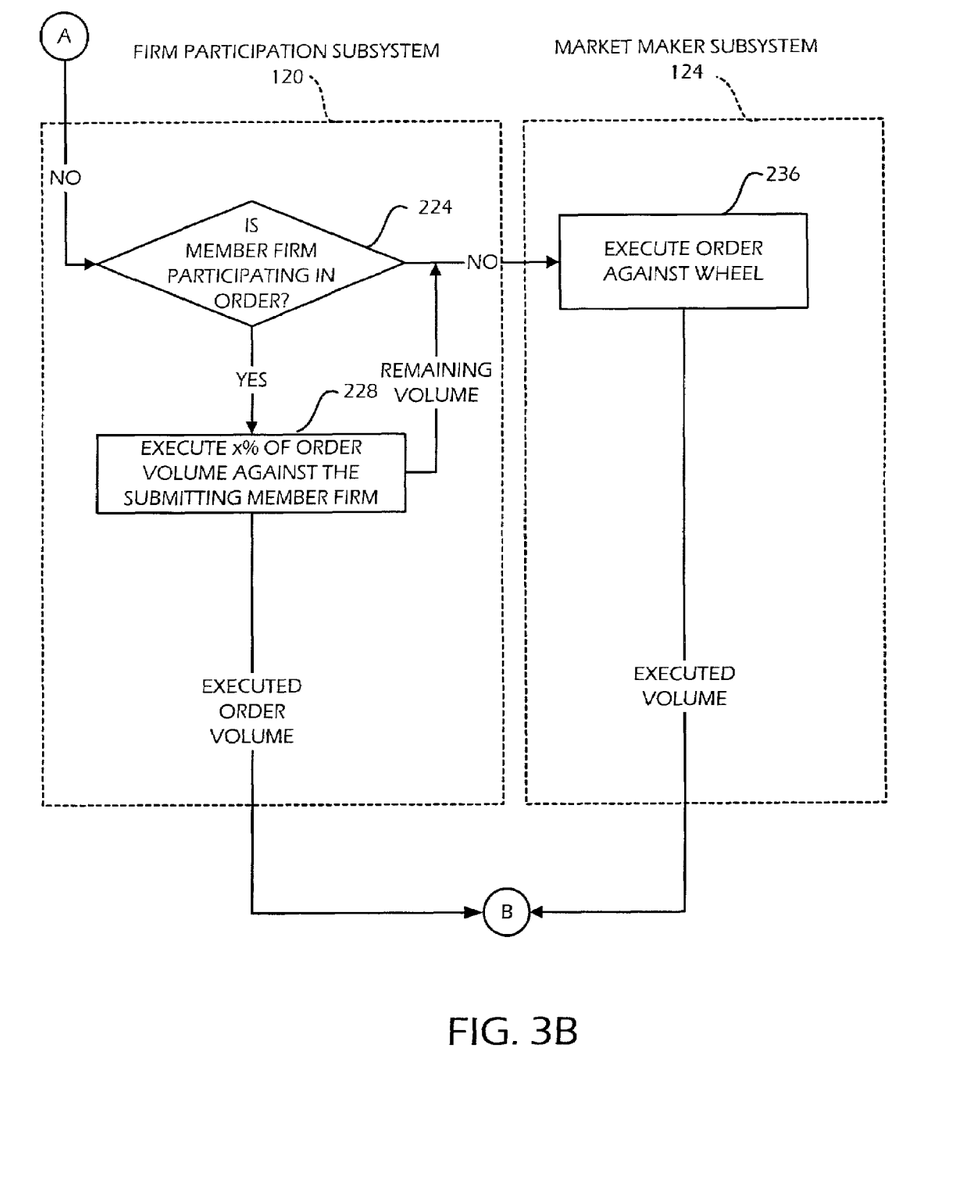

Referring now to FIGS. 3A and 3B, an example is shown for illustrating the execution process of the electronic execution system shown in FIG. 1. The illustration utilizes a specific example for purposes of demonstrating the process of execution. Therefore, it should be understood that the present embodiment is not limited to this specific example. Accordingly, assume that a book price commitment parameter is set at 10 (i.e., 10 contracts at a minimum are available at the disseminated quote). Also assume that the firm participation percentage is set at 20%. The disseminated quote is at 5.00-5.10. There is a book order to sell 5 contracts at 5.10. This electronic order might then be executed in the electronic trading system 100 as follows:

At step 200, a participant transmits an electronic order to buy 50 option contracts at the market, presently at 5.00-5.10. The electronic order to buy 50 option contracts is received at the order routing system 108.

At step 204, the order routing system 108 determines if the electronic order is eligible to participate in the automatic execution system 112. Guidelines may be put in place to prevent ineligible orders from entering the automated execution system 112. If the order is found ineligible, the electronic order is forwarded through the order routing system 108 to another subsystem for execution per step 208. If the electronic order is eligible to participate in the automated execution system 112, it is forwarded to the book process subsystem 116. For this example, assume that the electronic order to buy 50 option contracts is eligible for execution through the automated execution system 112.

At step 212, the book process subsystem 116 determines if a customer order is resting in the book at the prevailing market price. In this example, the market price is currently set at 5.00-5.10. If a customer order is not found in the book at the prevailing market price, the electronic order would be forwarded to the firm participation subsystem 120. However, there is a customer or book order willing to sell 5 option contracts at 5.10. So, yes there is a customer book order at the market value of 5.10.

At step 216, the book process subsystem 116 executes the 5 option contracts against the book order at 5.10. Then, the electronic order has an order volume of 45 contracts (50 buy option contracts−5 executed option contracts=45 buy option contracts). The book process subsystem 116 identifies executed and filled order volume. In this example, 5 option contracts have been executed and 45 option contracts remain. The executed volume is transmitted to the report filled order process per step 244 and the remaining order volume is transmitted to the firm participation subsystem 120 shown in FIG. 3B.

At step 224, the firm participation subsystem 120 receives the remaining 45 option contracts and determines if the participant is participating in the order. Earlier in this example, it was assumed that participant is participating in the order and that the firm participation percentage is set at 20%.

At step 228, the firm participation subsystem 120 executes the firm participation percentage or 20% of the remaining order against the participant. Therefore, the participant will receive 20% of the 45 option contracts or 9 option contracts on the contra-side of the order. Thus, for example, the participant would automatically receive 9 option contracts executed at a price of 5.10 in their firm proprietary account. The remaining portion of the order is 36 option contracts (45 buy option contracts–assigned to participant 9 option contracts=36 buy option contracts). The executed volume is transmitted to the report filled order process per step 244 (FIG. 3A) and the remaining order volume is transmitted to the market maker subsystem 124. According to this example, the order is not yet filled. In fact, 36 buy option contracts remain. Therefore, the remaining order of 36 option contracts is transmitted to the market maker subsystem 124 to execute the remaining order.

At step 236, the market maker subsystem 124 executes the remaining order against the market makers logged on to the market maker subsystem 124. In this example, the remaining order of 36 buy option contracts is executed at 5.10.

When the order is filled, then per step 244 of FIG. 3A, a fill report is preferably generated. In this example, the order has been filled, so a fill report is generated and distributed.

A participant report can also be generated. The fill report can be distributed to the participant to document the trade for each subsystem 116, 120, 124 if so desired. In addition, the report can be distributed to the market maker to document the transaction.

A more detailed example would include an automatic market quote updating system such as given by BestQuote of the Chicago Board Options Exchange of Chicago, Ill. As known in the art, the BestQuote system determines the exchange's best quote based off electronic inputs. Such electronic inputs could include the current market quote, orders resting in the book, or any manual quotes given by market makers or participants.

Figure 4:
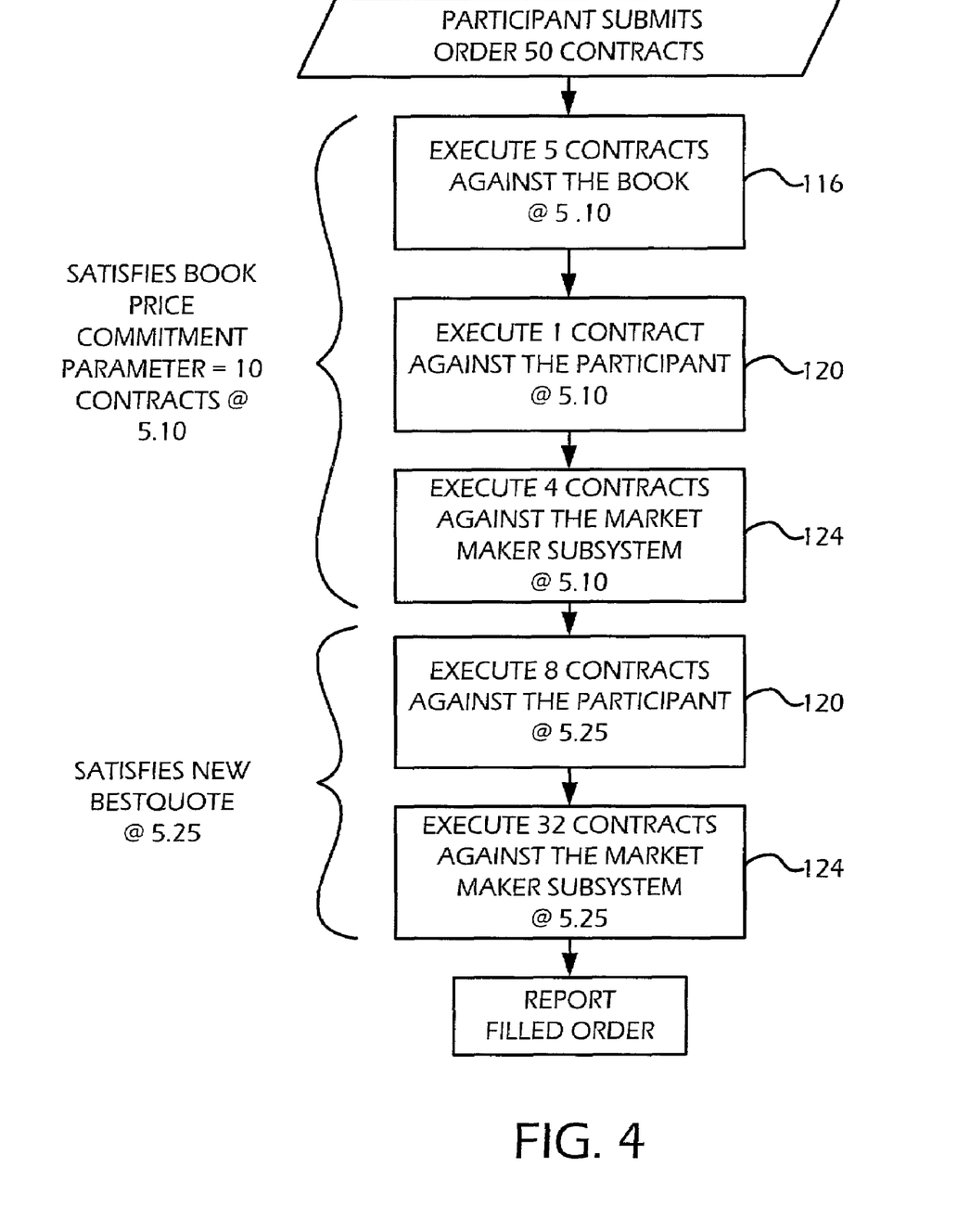
FIG. 4 is a flowchart showing another exemplary automatic execution process used in the system of FIG. 1.

FIG. 4 is used to illustrate another exemplary execution process of the electronic trading system 100 shown in FIG. 1 using Best Quote in addition to the market value. Similar to the example illustrated in FIGS. 3A and 3B, the flowchart in FIG. 4 pertains to a specific example for purposes of demonstrating another example of the process shown in FIG. 1. Therefore, it should be understood that the present embodiment is not limited to this specific example. It might be helpful to utilize the information from the earlier example (i.e., FIGS. 3A and 3B) with the exception that the current market quote is 5.00-5.25. So again, assume that a book price commitment parameter is 10 (i.e., 10 option contracts at a minimum are available at the disseminated quote). Also assume that the firm participation percentage is 20%. There is a book order to sell 5 contracts at 5.10 so the current market calculated and disseminated through BestQuote is 5.00-5.10. This electronic order might be executed in the electronic trading system 100 as follows:

Suppose a participant submits an electronic order, which was forwarded to the automatic execution system 112. The submitted electronic order is for 50 buy option contracts. Then, according to the exemplary embodiment, the book process subsystem 116 would execute the 5 option contracts against the book order at 5.10. In addition, the firm participation subsystem 120 would execute 1 option contract against the participant at 5.10 (20% of the remaining 5 contracts subject to the book price commitment parameter of 10 option contracts). Furthermore, the market maker subsystem 124 would execute 4 option contracts at 5.10. Consequently, the book price commitment parameter has been satisfied by trading 10 option contracts at 5.10. In the meantime, BestQuote calculates and disseminates a new offer of 5.25.

The remaining order for 40 option contracts might then be executed as follows: the firm participation subsystem 120 would execute 8 option contracts against the participant at 5.25. The market maker subsystem 124 would execute 32 contracts at 5.25.

Figure 5:
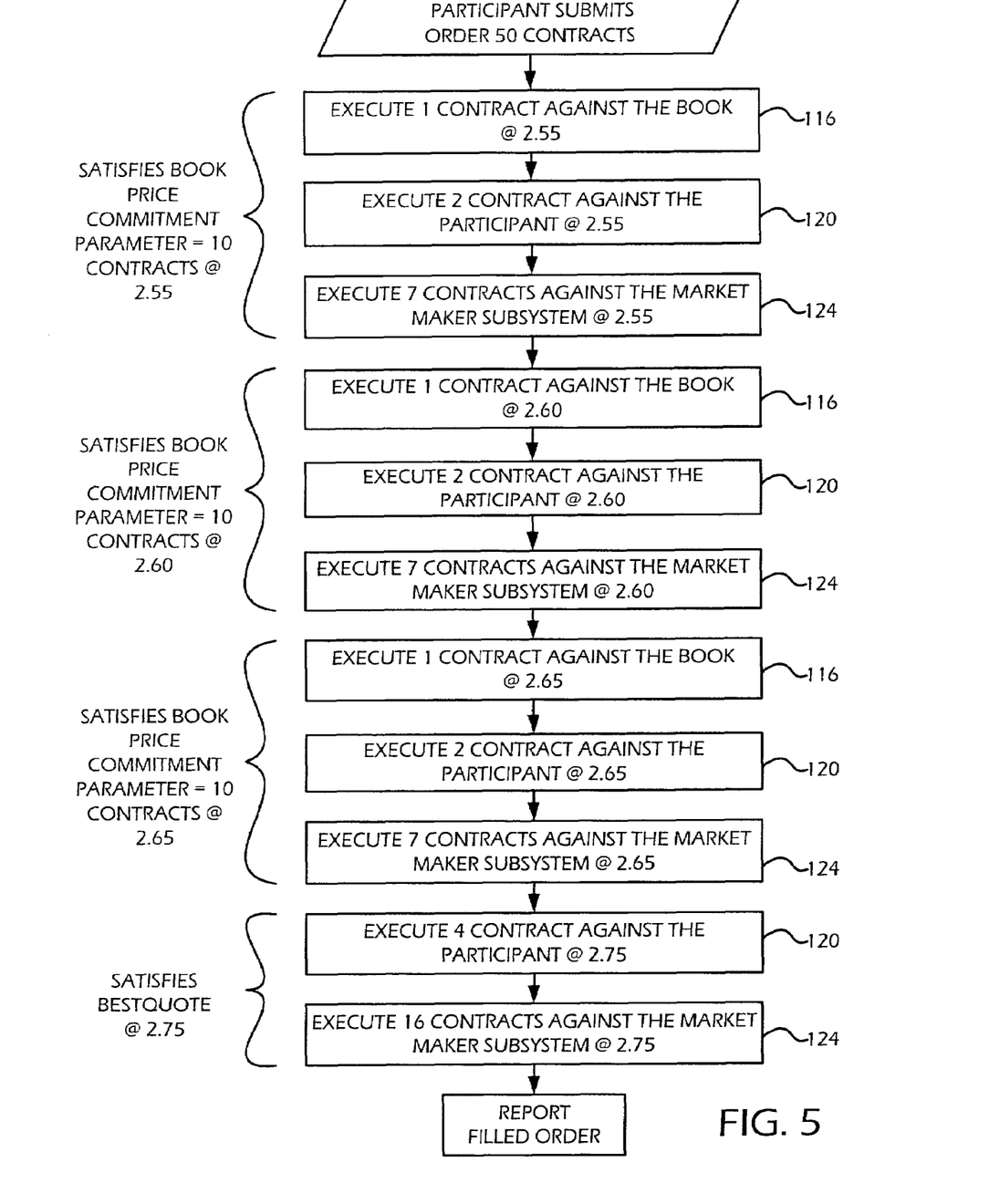
FIG. 5 is a flowchart showing yet another exemplary automatic execution process used in the system of FIG. 1.

FIG. 5 is another example illustrating the execution process shown in FIG. 1. Similar to the illustrations in FIGS. 3A, 3B, and 4, the illustration in FIG. 5 pertains to yet another specific example for purposes of demonstrating the process shown in FIG. 1. As before, it should be understood that the present embodiment is not limited to this specific example. Assume the book price commitment parameter is 10 option contracts and the firm participation percentage is 20%. There are three sell orders in the book; each for 1 contract at 2.55, 2.60, and 2.65. The crowd's current market quote is 2.50-2.75. The market, disseminated through BestQuote, is 2.50-2.55. A participant submits an electronic order to buy 50 option contracts. The electronic order might be executed as follows:

Assuming the electronic order was forwarded to the automatic execution system 112, the order is for 50 buy option contracts. Thus, according to the exemplary embodiment, the book process subsystem 116 would execute the 1 option contract against the book order at 2.55. In addition, the firm participation subsystem 120 would execute 2 option contracts against the participant at 2.55 (20% of the remaining 9 contracts subject to the book price commitment parameter of 10 option contracts is less than 2 but is rounded up to 2). Furthermore, the market maker subsystem 124 would execute 7 option contracts at 2.55. Consequently, the book price commitment parameter has been satisfied by trading 10 option contracts at 2.55. During this time, BestQuote would preferably re-calculate the new quote, 2.50-2.60, and disseminate it.

Furthermore, according to the exemplary embodiment, the book process subsystem 116 would execute the 1 option contract against the book order at 2.60. In addition, the firm participation subsystem 120 would execute 2 option contracts against the participant at 2.60 (20% of the remaining 9 contracts subject to the book price commitment parameter of 10 option contracts is less than 2, but is rounded up to 2). Furthermore, the market maker subsystem 124 would execute 7 option contracts at 2.60. Consequently, the book price commitment parameter has been satisfied by trading 10 option contracts at 2.60. During this time BestQuote would preferably re-calculate the new quote, 2.50-2.65, and disseminate it.

Moreover, according to the exemplary embodiment, the book process subsystem 116 would execute the 1 option contract against the book order at 2.65. In addition, the firm participation subsystem 120 would execute 2 option contracts against the participant at 2.65 (20% of the remaining 9 contracts subject to the book price commitment parameter of 10 option contracts is less than 2, but is rounded up to 2). Furthermore, the market maker subsystem 124 would execute 7 option contracts at 2.65. Consequently, the price book commitment parameter has been satisfied by trading 10 option contracts at 2.65. During this time, BestQuote would preferably re-calculate the new quote 2.50-2.75 and disseminate it.

There are no remaining book orders, and there are 20 buy option contracts left. Therefore, four contracts would be filled at 2.75 against the firm participant (20% of 20 option contracts=4 option contracts). The remaining 16 contracts would be executed against the market maker subsystem 124 at 2.75.

The firm participation subsystem 120 preferably utilizes standard rounding methods when calculating the stated percentage. For example, if the percentage is set to 20%, participants would not receive any order volume on trades of two contracts or less and will preferably receive at least one contract when the number of contracts is three or more.

It would be up to the participant to assign its order flow in a given class to the broker acronym of its choice. If the member firm would prefer to assign the order flow in a given class to more than one broker, that firm might have to determine an alternative method.

Figure 6:
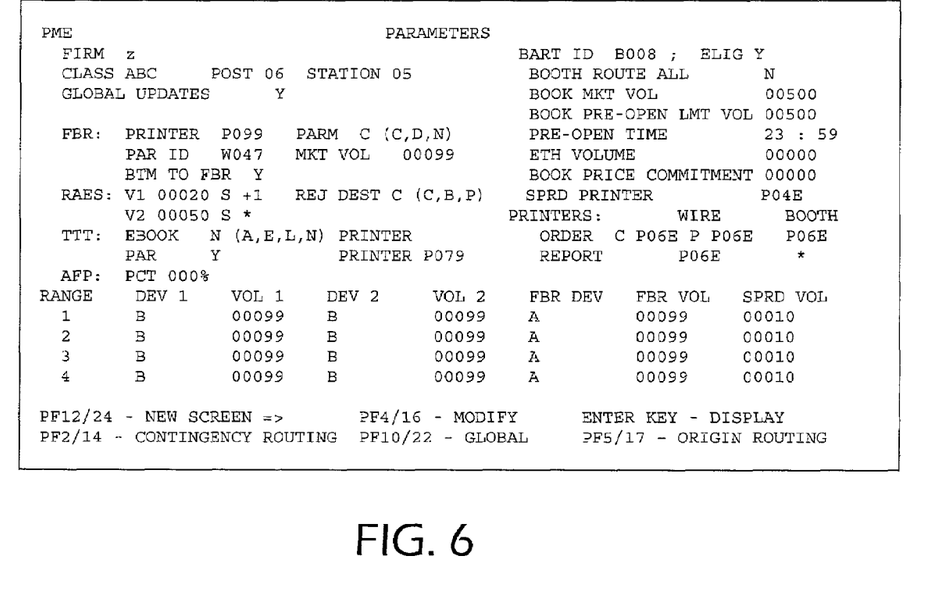
FIG. 6 is a screen shot of an exemplary parameter screen used in the system of FIG. 1.

FIG. 6 is a screen shot of an exemplary parameter screen used in the system of FIG. 1. The parameter screen includes a field (shaded in FIG. 6) to designate how much of a percent of an electronic order would be assigned to the participant for that class of options. The field following the 'heading' of "AFP: PCT" would be defined as 'numeric only' with a minimum value of '000%' (in which case the firm participation subsystem 120 is not applicable) and a maximum value of '100%'. The "AFP: PCT" field might be globally updateable as one firm/one class, one firm/all classes, one firm/all classes at a station, or one firm/all classes at a post.

During processing at the firm participation subsystem 120 the designated firm participation percentage would be utilized (if the value is greater than zero) so that a participant can participate in their own customer order flow. The remainder of the trade volume is preferably sent through the market maker subsystem 124.

Figure 7:
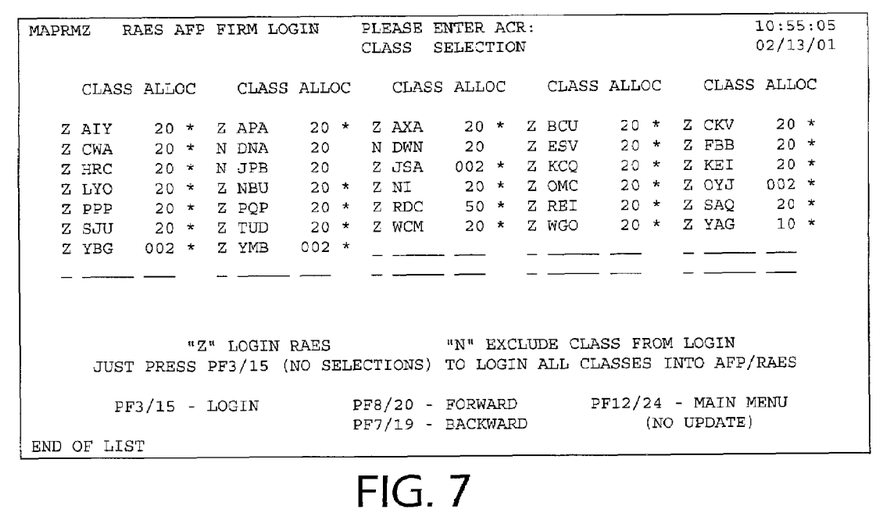
FIG. 7 is a screen shot of an exemplary automatic execution login screen used in the system of FIG. 1.

FIG. 7 illustrates an exemplary LOGIN screen that enables a participant the ability to login into the automated execution system 112. The screen might display the participant's classes that have non-zero percentage values in the 'AFP PCT' fields on the FIRM/CLASS Parameters screens. At the top of the new LOGIN screen a field to input a participant acronym will designate the participant to be assigned the firm participation trades for the chosen classes.

Figure 8:
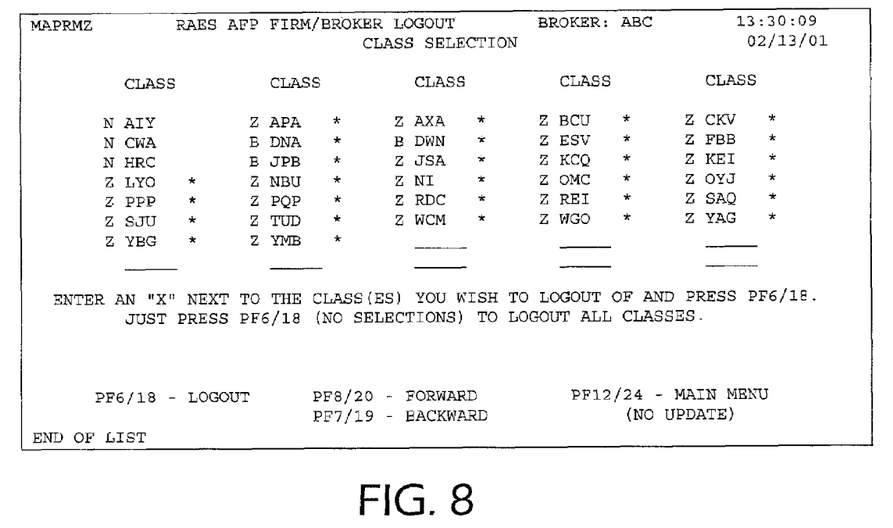
FIG. 8 is a screen shot of an exemplary automatic execution logout screen used in the system of FIG. 1.

FIG. 8 illustrates an exemplary LOGOUT screen that enables a participant, market maker or specialist the ability to logout of the automated execution system 112. The screen might display the firm's classes that have non-zero percentage values in the 'AFP PCT' fields on the FIRM/CLASS Parameters screens. From this screen, either individual or all classes can be signed out of AFP trade processing for the designated firm/broker acronym.

The firm participation subsystem preferably executes the percentage of the order indicated by the "AFP PCT" parameter (when the value is greater than zero and based on 'standard rounding' techniques) against the participant acronym signed in by the participant that provided the electronic order.

However, in the exemplary embodiment, incoming electronic orders are subject to the book process subsystem 116 before they become subject to the firm participation subsystem 120, so as to not trade in front of the book. Although, when the number of contracts in the book is less than the book price commitment parameter, the remainder of the book price commitment parameter are preferably shared between firm participation subsystem 120 and the market maker subsystem 124.

The present embodiments, described herein as exemplary embodiments, provide a participant that generates customer order flow the ability to participate in the automatic execution trades without affecting the price of execution to the customer. A participant such as a broker or firm may submit buy and sell orders to an automated execution system. The automated execution system then enables the participant to desirably participate in the trades resulting from that order flow. Therefore, by allowing a participant that generates order flow to participate in the generated order flow, trading facilities can desirably attract participants to their respective automated execution system.

It should be understood that the programs, processes, methods and systems described herein are not related or limited to any particular type of trading system, unless indicated otherwise. Various types of general purpose or specialized trading systems may be used in accordance with the teachings described herein. Furthermore, the screen shots illustrating the various logon screens are exemplary only, and may also be implemented using a Microsoft Windows, Linux, or other operating system based interface, such as is known in the art.

In view of the wide variety of embodiments to which the principles of the present embodiments can be applied, it should be understood that the illustrated embodiments are exemplary only, and should not be taken as limiting the scope of the present invention. For example, more or fewer elements may be used in the figures.

The claims should not be read as limited to the described order or elements unless stated to that effect. Therefore, all embodiments that come within the scope and spirit of the following claims and equivalents thereto are claimed as the invention.

What is claimed is:

1. A method of trading products over an automated execution system, comprising:

receiving an electronic order for a product submitted by a participant into the automated execution system, the automated execution system having a book process subsystem, a firm participation subsystem and a market maker subsystem;

automatically executing an initial portion of the electronic order against a stored order in the book process subsystem;

automatically routing a first remaining portion of the electronic order to the firm participation subsystem, wherein a percentage of the first remaining portion of the electronic order is assigned by the automated execution system and executed against the participant; and automatically routing a second remaining portion of the electronic order, if any, to the market maker subsystem, wherein the second remaining portion of the electronic order is executed against another participant.

2. The method of claim 1 wherein receiving an electronic order further comprises forwarding the electronic order over a computer network system from an order routing system.

3. The method of claim 1 wherein the product comprises a security, derivative, or commodity having at least one sell order.

4. The method of claim 1 wherein the product comprises a security, derivative, or commodity having at least one buy order.

5. The method of claim 1 wherein the product is at least one unit of a security, derivative, or commodity.

6. The method of claim 1 wherein the participant submits the electronic order for a customer, and wherein the customer is assured to receive the National Best Bid or Offer for the electronic order.

7. A computer-implemented method of providing participation in an automated execution system, comprising:

automatically routing an electronic order for an option contract submitted by a participant into the automated execution system over a computer network;

receiving the electronic order over the computer network, wherein the electronic order is further automatically routed to a book process subsystem;

automatically executing in order priority the electronic order against a book order irrespective of broker review; and automatically assigning a first remaining portion of the electronic order to the participant.

8. The method of claim 7 further comprising:

executing a second remaining portion of the electronic order wherein the second remaining portion of the electronic order is executed against a market maker subsystem.

9. The method of claim 7 wherein the step of routing an electronic order comprises entering the electronic order into a user device.

10. The method of claim 7 wherein the step of receiving the electronic order over the computer network comprises receiving the electronic order at a trading facility.

11. The method of claim 7 wherein the step of automatically executing in order priority the electronic order against a book irrespective of broker review comprises attempting to match the electronic order against an order resting in a book.

12. The method of claim 7 wherein the step of assigning a first remaining portion of the electronic order to the participant comprises executing the first remaining portion of the electronic order according to a predetermined firm participation percentage.

13. The method of claim 7 wherein the participant submits the electronic order for a customer, and wherein the customer receives the National Best Bid or Offer for the electronic order.

14. A method of executing an electronic order over an automated execution system, the method comprising:

receiving the electronic order from a firm participant;

automatically executing in order priority at least a portion of the electronic order against an order in an electronic book at a prevailing market price irrespective of broker review;

automatically executing a predetermined first remaining portion of the electronic order against the firm participant; and automatically executing a second remaining portion of the electronic order against one or more market makers.

15. The method of claim 14 wherein automatically executing a predetermined portion of the electronic order against the firm participant comprises the participant taking the contra-side to its own customer order.

16. The method of claim 14 wherein the predetermined portion of the electronic order is in a range of 0 to 100% of the electronic order.

17. The method of claim 14 wherein the market makers comprise market makers, specialists, and designated primary market makers (DPMs).

18. An automated execution system for trading products, the system comprising:

an order routing system for automatically routing an electronic order for a product submitted by a firm participant to the automated execution system;

a book process subsystem for automatically allocating in order priority at least a portion of the electronic order against an electronic book at a prevailing market price irrespective of broker review; and a firm participation subsystem for automatically determining if the participant is participating in the electronic order and, if so, automatically allocating a predetermined percentage of a contra-side of a remaining portion of the electronic order to the firm participant irrespective of broker review.

19. The system of claim 18 wherein the order routing system creates a fill report when the electronic order is filled.

20. The system of claim 18 wherein the product is at least one security, commodity, or derivative.

\* \* \* \* \*

UNITED STATES PATENT AND TRADEMARK OFFICE
CERTIFICATE OF CORRECTION

| | | |
|---|---|---|
| PATENT NO. | : 7,653,584 B2 | Page 1 of 1 |
| APPLICATION NO. | : 09/896061 | |
| DATED | : January 26, 2010 | |
| INVENTOR(S) | : Schmitz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2172 days.

Signed and Sealed this

Twenty-third Day of November, 2010

David J. Kappos
*Director of the United States Patent and Trademark Office*